United States Patent [19]
Shapiro et al.

[11] Patent Number: 5,819,084
[45] Date of Patent: Oct. 6, 1998

[54] CO-PRESENCE DATA RETRIEVAL SYSTEM

[75] Inventors: Ehud Shapiro, Rehovot; Yosef Mass, Ramat Gan; Ariel Sella, Tel Aviv, all of Israel

[73] Assignee: Ubique Ltd., Rehovot, Israel

[21] Appl. No.: 827,845

[22] Filed: Apr. 11, 1997

Related U.S. Application Data

[62] Division of Ser. No. 236,293, May 2, 1994, abandoned.

[51] Int. Cl.[6] ........................................................ G06F 17/30
[52] U.S. Cl. ........................ 395/610; 395/614; 395/200.04
[58] Field of Search ................................... 395/600, 425, 395/1, 610, 614, 200.04, 200.08, 200.12, 682, 683, 685

[56] References Cited

U.S. PATENT DOCUMENTS

| | | | |
|---|---|---|---|
| 5,008,853 | 4/1991 | Bly et al. | 395/153 |
| 5,159,669 | 10/1992 | Trigg et al. | 395/159 |
| 5,220,657 | 6/1993 | Bly et al. | 395/425 |
| 5,388,196 | 2/1995 | Pajak et al. | 395/329 |
| 5,408,470 | 4/1995 | Rothrock et al. | 370/261 |
| 5,452,299 | 9/1995 | Thessin et al. | 370/260 |
| 5,511,196 | 4/1996 | Shackelford et al. | 395/683 |
| 5,625,809 | 4/1997 | Dysart et al. | 395/614 |
| 5,634,124 | 5/1997 | Khoyi et al. | 395/614 |

*Primary Examiner*—Thomas G. Black
*Assistant Examiner*—M. N. Von Buhr
*Attorney, Agent, or Firm*—Skjerven, Morrill, MacPherson, Franklin & Friel

[57] ABSTRACT

A data retrieval system includes a data server which retrieves a data object from a data repository and a system for associating a virtual place with a retrieved data object. The virtual place provides co-presence to users which access the retrieved data object. A method for upgrading a data retrieval system comprised of a data server capable of retrieving data objects from a data repository and a plurality of data-retrieval clients is aLso described. The method includes the steps of adding a co-presence server comprising at least one virtual place associated with one of said data objects and upgrading at least two of said data-retrieval clients with the following abilities: a) the ability to open a separate communication channel with said co-presence server; b) the ability to map retrieved data objects to said virtual places; c) the ability to display co-presence information; d) the ability to enable users to communicate; and e) the ability to notify said co-presence server when said data-retrieval client is terminated.

22 Claims, 4 Drawing Sheets

CO-PRESENCE DATA RETRIEVAL SYSTEM

This application is a continuation of application Ser. No. 08/236,293, filed May 2, 1994 now abandoned.

FIELD OF THE INVENTION

The present invention relates to data retrieval systems generally and to data retrieval systems with co-presence mechanisms in particular.

BACKGROUND OF THE INVENTION

Data retrieval systems are known in the art. A typical one is shown in FIG. 1 to which reference is now made. Data retrieval systems typically consist of a data server 10 and multiple data-retrieval clients 12 which are typically separate computers. Upon command of a data-retrieval client 12, the data server 10 accesses a data repository 14, or database, that contains data objects 16 therein. Data objects 16 are typically files of information. The data-retrieval clients 12 also communicate with a user 17, typically through an interactive display 18.

A typical data retrieval operation, depicted in FIG. 2 to which reference is now made, proceeds as follows: upon receipt of an instruction (arrow 1) from the user 17 to retrieve a certain data object 16, the data-retrieval client 12 sends (arrow 2) a request to the data server 10 on which the object resides. The data server 10 retrieves the requested data object 16 (arrow 3) from the data repository 14 and sends the object 16 back (arrow 4) to the data-retrieval client 12. The data-retrieval client 12 then displays (arrow 5) the retrieved data object 16 to the user 17.

Additional features incorporated in a data retrieval system may include a data-management mechanism that allows a data-retrieval client 12 to create a new data object 16, to modify a retrieved data object 16 and to send the created or modified data object 16 back to the data server 10 for storage in the data repository 14, and a permission mechanism that allows the server 10 to approve or deny certain client requests.

Examples of data retrieval systems, some of which include the additional features, include the file transfer protocol (FTP), hypertext transfer protocol (HTTP), Gopher and network file systems (NFS) standards, network news servers (NNTP), DEC Notes of Digital Electric Corporation of the USA, Lotus Notes of Lotus Inc. of the U.S.A., Novell NetWare of Novell Inc. of the U.S.A., and the relational database management systems (RDBMS) such as those manufactured by Oracle, Sybase, and Informix, all of the U.S.A.

SUMMARY OF THE PRESENT INVENTION

It is an object of the present invention to provide data retrieval systems with a co-presence mechanism with which two or more users, who retrieve the same data object at the same time, can become aware of each other and consequently to communicate with each other in real time. The data retrieval system enables a user who accesses a certain document to discuss it, in real-time, with others who might happen to access the document at the same time.

"Co-presence" is the capability to enable two or more users to be "present" at a "virtual" place. For example, COLLAGE, developed by the National Center for Supercomputing Applications (NCSA) at the University of Illinois, is a client-server package that supports co-presence over a shared whiteboard. A user copies a data object from a data server to an existing COLLAGE session and then manipulates the data object in the COLLAGE session. Other users which join the COLLAGE session can also manipulate the data object; however, in order to join the session, the users need to know the collage session address in advance.

The Internet Relay Chat is a real-time, Internet-wide, multi-party, text-based interaction tool. It allows people to interact in real-time about a subject of their choice, and to join and leave virtual "channels" devoted to specific topics.

Multiple-User Dungeons (MUDs) is a family of multi-player interactive games which provide a notion of interconnected places, wherein each place may contain objects and passages to other places. Players can go from one place to another, communicate with "co-present" players, and interact with the objects in the place.

These co-present systems provide virtual places at which people can communicate. However, the co-presence is not data-related, or created in conjunction with retrieval of a data object, as is provided in the present invention.

There is therefore provided, in accordance with a preferred embodiment of the present invention, a data retrieval system which includes a data server which retrieves a data object from a data repository and a system for associating a virtual place with a retrieved data object. The virtual place provides co-presence to users which access the retrieved data object.

Additionally, in accordance with one preferred embodiment of the present invention, the system for associating includes a co-presence server and at least two co-presence data-retrieval clients capable of communicating with the data server and with the co-presence server. The co-presence server includes at least one virtual place associated with one of the data objects. The data retrieval clients include object association apparatus and co-presence apparatus. The object association apparatus associates a data object received from the data server with one of the virtual places in the co-presence server. The co-presence apparatus provides communication with other users associated with the associated virtual place.

Alternatively, in accordance with a second preferred embodiment of the present invention, the system for associating also includes a co-presence server and at least two co-presence data-retrieval clients. In this embodiment, the co-presence server is capable of communicating with the data server and the co-presence data-retrieval clients communicate only with the co-presence server. The object association apparatus of the co-presence data-retrieval clients associates a data object received from the co-presence server with one of the virtual places in the co-presence server. The co-presence apparatus provides communication with other users associated with the associated virtual place.

Moreover, in accordance with both preferred embodiments of the present invention, the co-presence server includes a changing plurality of place processes, one for each virtual place, and a managing process for providing communication from the co-presence data retrieval clients to the place processes.

Furthermore, in accordance with both preferred embodiments of the present invention, the object association apparatus includes apparatus for moving to a new virtual place.

Finally, there is also provided, in accordance with a third preferred embodiment of the present invention, a method for upgrading a data retrieval system comprised of a data server capable of retrieving data objects from a data repository and a plurality of data-retrieval clients. The method includes the steps of a) adding a co-presence server comprising at least one virtual place associated with one of the data objects and b) upgrading at least two of the data-retrieval clients with the following abilities:

the ability to open a separate communication channel with the co-presence server;

the ability to map retrieved data objects to the virtual places;

the ability to display co-presence information;

the ability to enable users to communicate; and the ability to notify the co-presence server when the data-retrieval client is terminated.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 3:
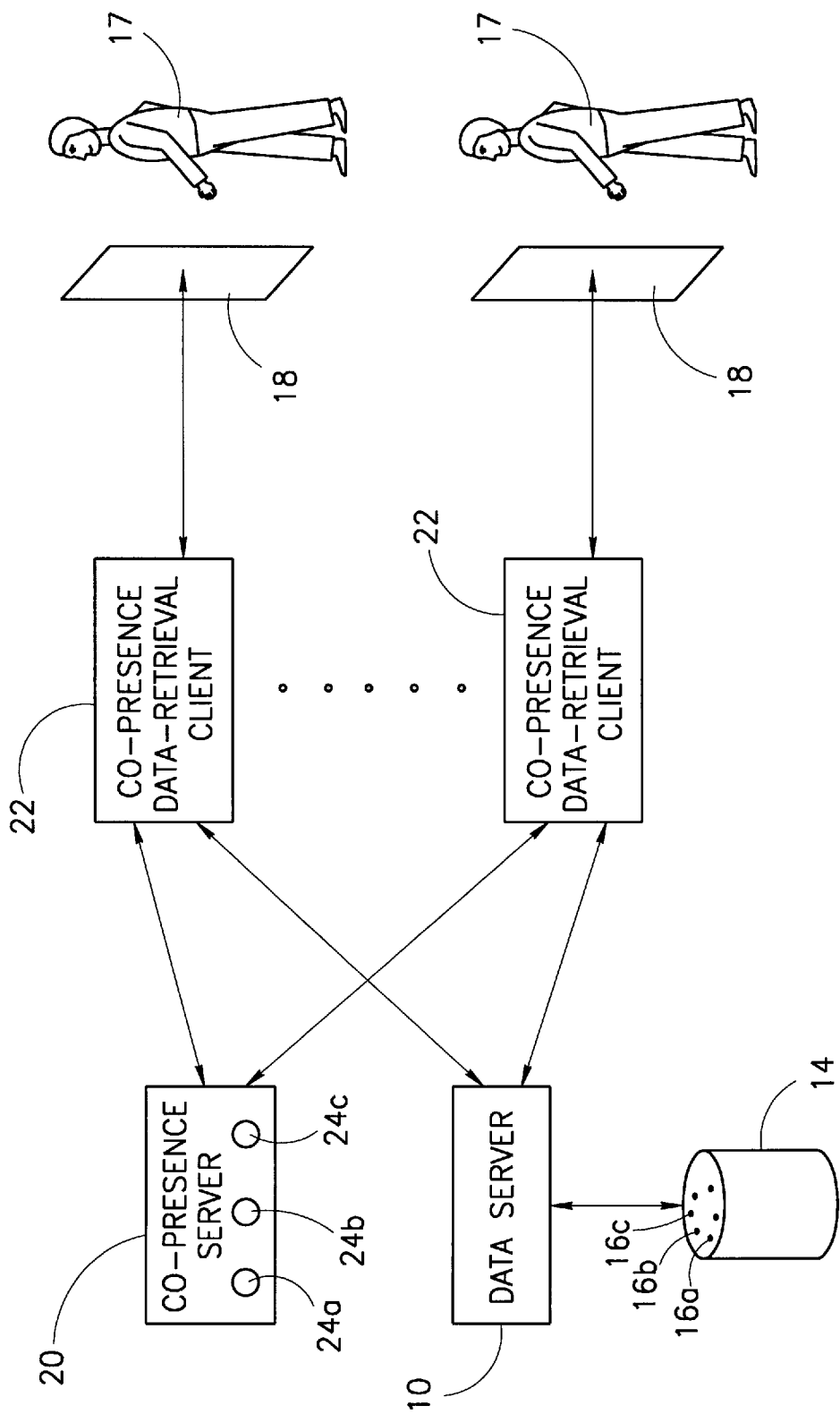
FIG. 3 is a schematic illustration of a data retrieval system with a co-presence server, constructed and operative in accordance with a first preferred embodiment of the present invention.
Figure 4:
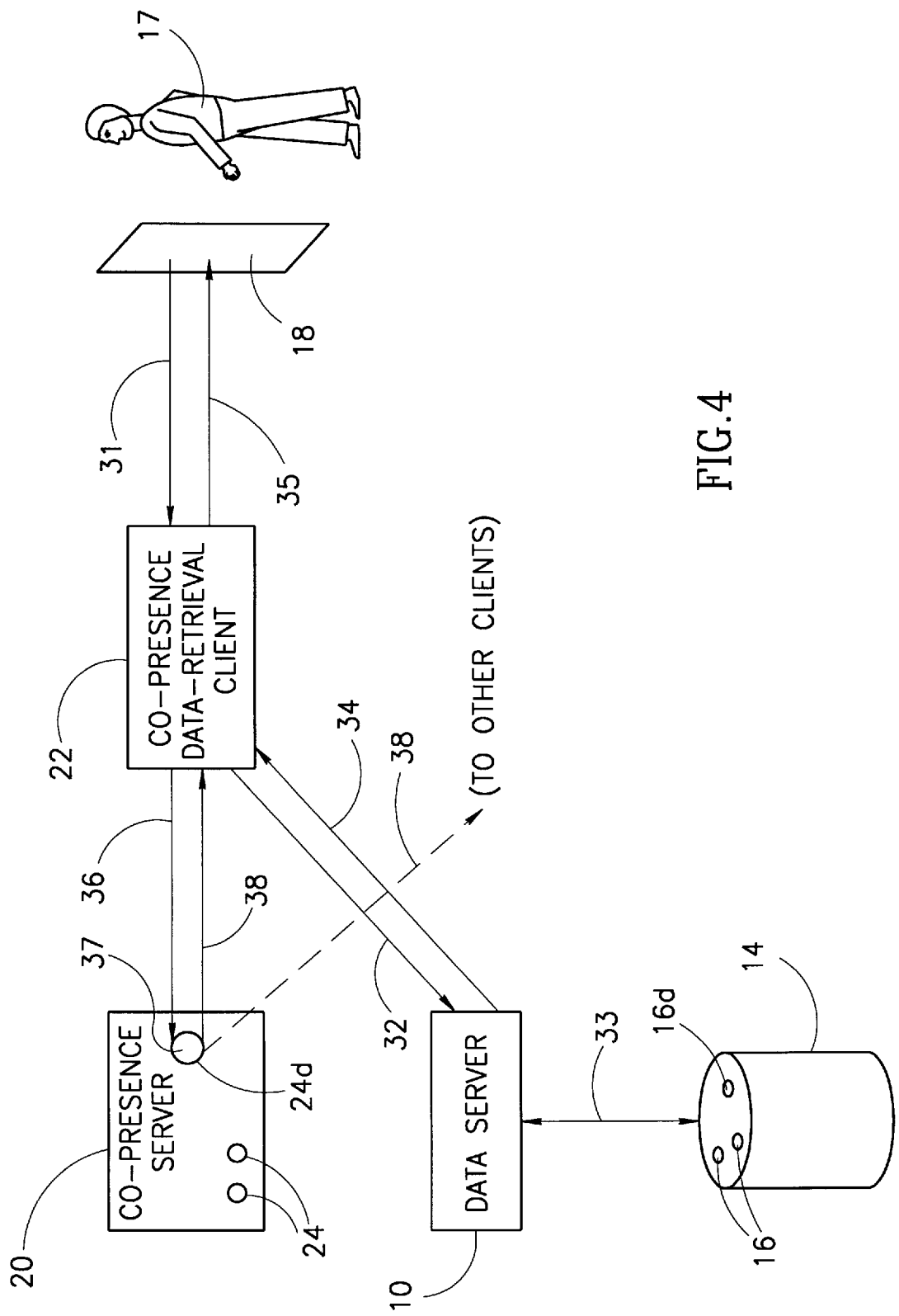
FIG. 4 is a schematic illustration of a co-present data retrieval operation.

Reference is now made to FIGS. 3 and 4 which illustrate the data-retrieval system of the present invention. The system of the present invention typically comprises data server 10 and data repository 14 as in the prior art. It also comprises, in accordance with a preferred embodiment of the present invention, a co-presence server 20 and a multiplicity of co-presence data-retrieval clients 22 each communicating with data server 10, co-presence server 20, and, through the associated display 18, with a user 17.

As in the prior art, each data-retrieval client 22 requests a data object 16 through the data server 10 which retrieves the requested data object 16 from the data repository 14. In addition, in accordance with a preferred embodiment of the present invention, at the same time, the co-presence data-retrieval client 22 also informs the co-presence server 20 that it has retrieved a specific data object 16, for example object 16a. In response, the co-presence server 20 adds the data-retrieval client 22 to a virtual place 24 associated with the retrieved data object 16a. Client 22 associates virtual places 24a–24c with retrieved data objects 16a–16c.

For the purposes of clarity of discussion, we will state that the co-presence server 20 maintains a virtual place 24 for each data object 16 stored in the data server 10. It will be appreciated that the co-presence server 20 can also create a virtual place 24 on demand, when the first user becomes present at the data object 16, and can remove the virtual place 24 when no one is present.

All users which access a data object 16 via data-retrieval client 22 are added to the virtual place 24 associated with the data object 16 that they accessed. In addition, co-presence server 20 provides each virtual place 24 with inter-user communication capabilities such that any user which accesses a data object 16 can communicate, if he so desires, with the other users which are currently utilizing the same data object 16. The co-presence server 20 allows a user 17 who is present at a data object 16 to become aware of other co-present users 17 and provides a means for co-present users 17 to communicate with each other in real time. The communication between users 17 can also be client-to-client if communication through the co-presence server 20 is slow.

The co-presence server 20 essentially turns each data object into a virtual place where users 17 can meet to view the data object 16, to modify it, and to discuss it. For example, if a data server 10 contains user manuals for a certain product, then it might be useful for the product's vendor to place a help-desk person at the virtual place, or places, associated with the user manuals. The help-desk person can then assist, in real-time, those users who access the user manuals, if they need additional assistance or have difficulties "finding their way" through the product's documentation.

The co-presence server 20 and the co-presence data-retrieval client 22 follow a co-presence protocol which is illustrated with arrows 31–38 of FIG. 4.

Figure 1:
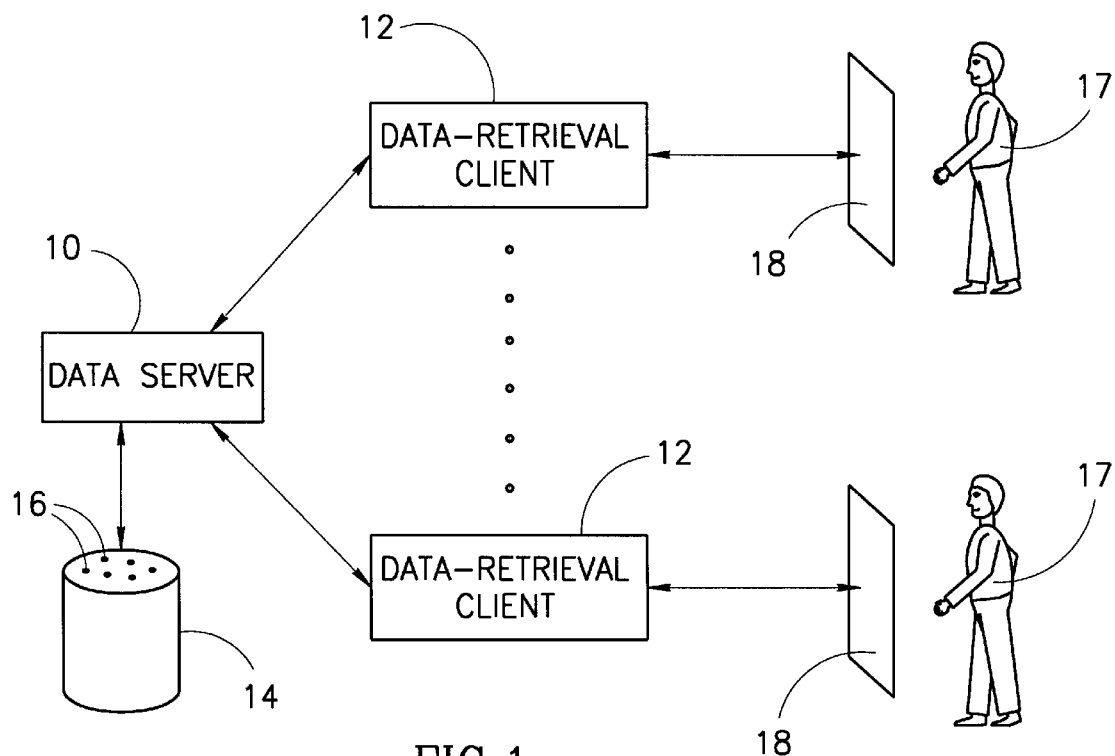
FIG. 1 is a schematic illustration of a prior art data retrieval system.
Figure 2:
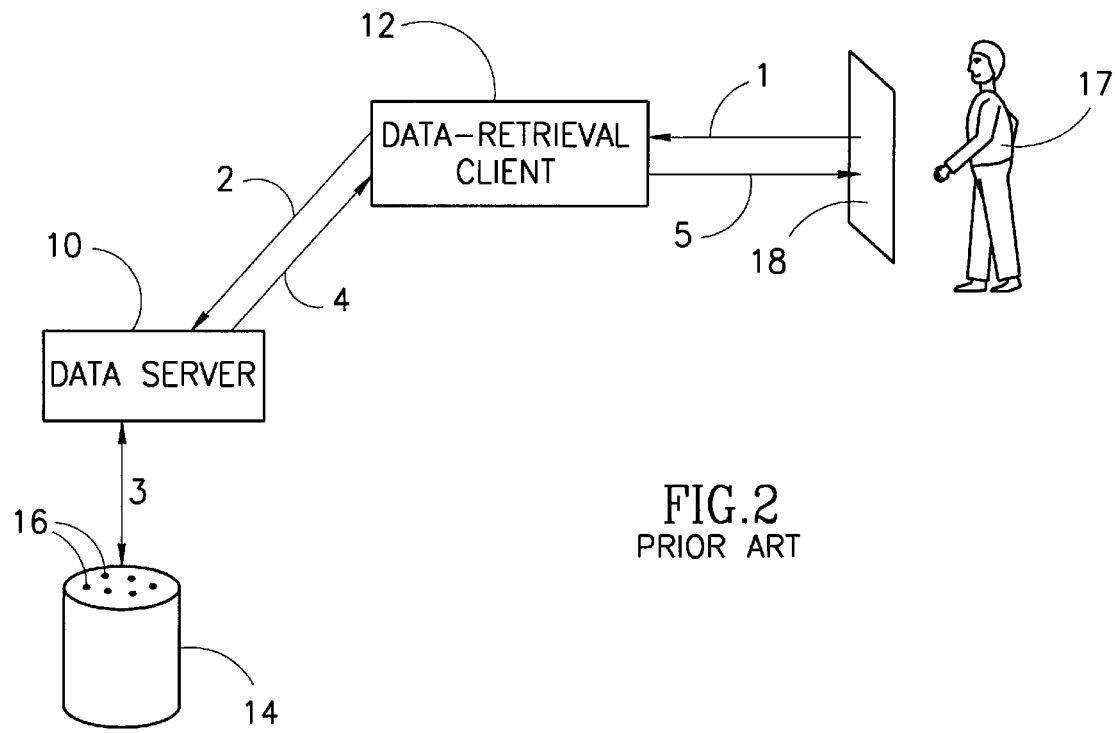
FIG. 2 is a schematic illustration of one prior art data retrieval operation.

A user 17 retrieves a data object 16d from a certain data server 10 in accordance with the protocol described in the prior art (arrows 31–35, similar to arrows 1–5 of FIG. 2). At the same time, the co-presence data-retrieval client 22 sends (arrow 36) a message to virtual place 24d within the co-presence server 20 which is associated with the data object 16d, to the effect that the user has accessed the data object 16d. (Typically, the data objects 16 have well-defined names on the data server 10. Clients 22 utilize the same or corresponding names to identify the corresponding virtual places 24). The virtual place 24d then adds (step 37) the user to the list of co-present users, and sends a message (arrow 38) to that effect to all co-present users, including to the user which just joined the virtual place 24d.

When a user 17 present at a data object 16 wishes to send a message to selected ones of the co-present users 17, the first user 17 sends a message to that effect, via co-presence data-retrieval client 22 and the co-presence server 20, to the associated virtual place 24 which, in turn, relays the message to the selected users 17 present at the data object 16.

When a user 17 ceases to be present at a data object 16 (either due to the retrieval of another data object 16 from the same or another data server 10 or due to closure of its co-presence data-retrieval client 22), the co-presence data-retrieval client 22 sends a message (arrow 36) to that effect to the virtual place 24 which, in turn, deletes the user 17 from the list of co-present users. Virtual place 24 then sends a message (arrow 38) to all remaining co-present users 17 notifying them of the event.

The co-presence protocol can be described by the operations performed by the co-presence data-retrieval client 22 and by the co-presence server 20 and virtual place 24. The following pseudocode describes the protocol:

For the client 22 of user U:
    Assume user U already has document D1 from server S1.
    When user U requests document D2 from server S2:
        1. Attempt to retrieve document D2 from server S2;
        2. If the retrieval is successful, send the following message to the virtual place P(D1) in co-presence server C(S1) corresponding to document D1: "U left for virtual place D2 in server S2".
    When user U requests to say text T:

send the message "U said T" to the co-presence server C(S2).

Upon receipt of message "User V entered (or left) for (from) virtual place P(Dj) in server Sk":
  display to user U the current list of users in the virtual place.

Upon receipt of the message "V said T":
  display to user U the message "V said T".

For the virtual place P(Di) on co-presence server C(Si)
Let the set of co-present users be CP:
  Upon receipt of message "U left for virtual place P(Dj) in server Sk:
    1. Delete user U from the set CP of co-present users
    2. Send to every remaining user V in CP the message: "U left for virtual place P(Dj) in server Sk
  Upon receipt of the message "U entered from virtual place P(Dj) in server Sk:
    1. Add user U to the set CP of co-present users
    2. Send to every user V in the set CP of co-present users the message "U entered from virtual place P(Dj) in server Sk.
  Upon receipt of message "U said T"
    Send the message "U said T" to every user in the set CP of co-present users, The co-presence server 20 can be implemented in any way which provides co-presence. In one embodiment, the co-presence server 20 is implemented as a Unix process, executing a concurrent programming language called flat concurrent Prolog (FCP). Using an FCP internal lightweight process mechanism, as described in U.S. Pat. No. 5,222,221 to Houri et al. which is hereby incorporated by reference, each virtual place 24 can be implemented as a place process, each formed of a collection of FCP processes. Each FCP process obeys the co-presence protocol described hereinabove.

The co-presence server 20 receives communications on a pre-assigned and published port whose identity is incorporated in the co-presence data-retrieval client 22. The co-presence server 20 typically receives messages from the co-presence data-retrieval clients 22 and provides them to the appropriate virtual place 24. In addition, if desired, the managing Unix process (the co-presence server 20) can also create a featherweight process (virtual place 24) whenever a first user accesses a data object 16 and can remove a process whenever there cease to be users co-present at the relevant virtual place 24.

It will be appreciated that, because communication with the co-presence server 20 is separate from the data-retrieval operations, the data-retrieval system of the present invention can operate with standard data-retrieval clients 12 which do not have any co-presence capability.

It will further be appreciated that the system of the present invention can easily be created from an existing prior art data-retrieval system. The upgrading process involves adding a co-presence server 20, as described hereinabove, and modifying the data-retrieval clients 12 to become co-presence data-retrieval clients 22 through the addition of the following capabilities:

a) the ability to open an additional communication channel with the co-presence server 20;
  b) the ability to map data objects 16 to virtual places 24;
  c) the ability to display co-presence information;
  d) the ability to enable users 17 to communicate in real time; and
  e) the ability to notify the co-presence server 20 when the client 22 is terminated or closed down.

It will be appreciated that data-retrieval clients which have not been upgraded can still operate within the data-retrieval system of FIGS. 3 and 4.

Figure 5:
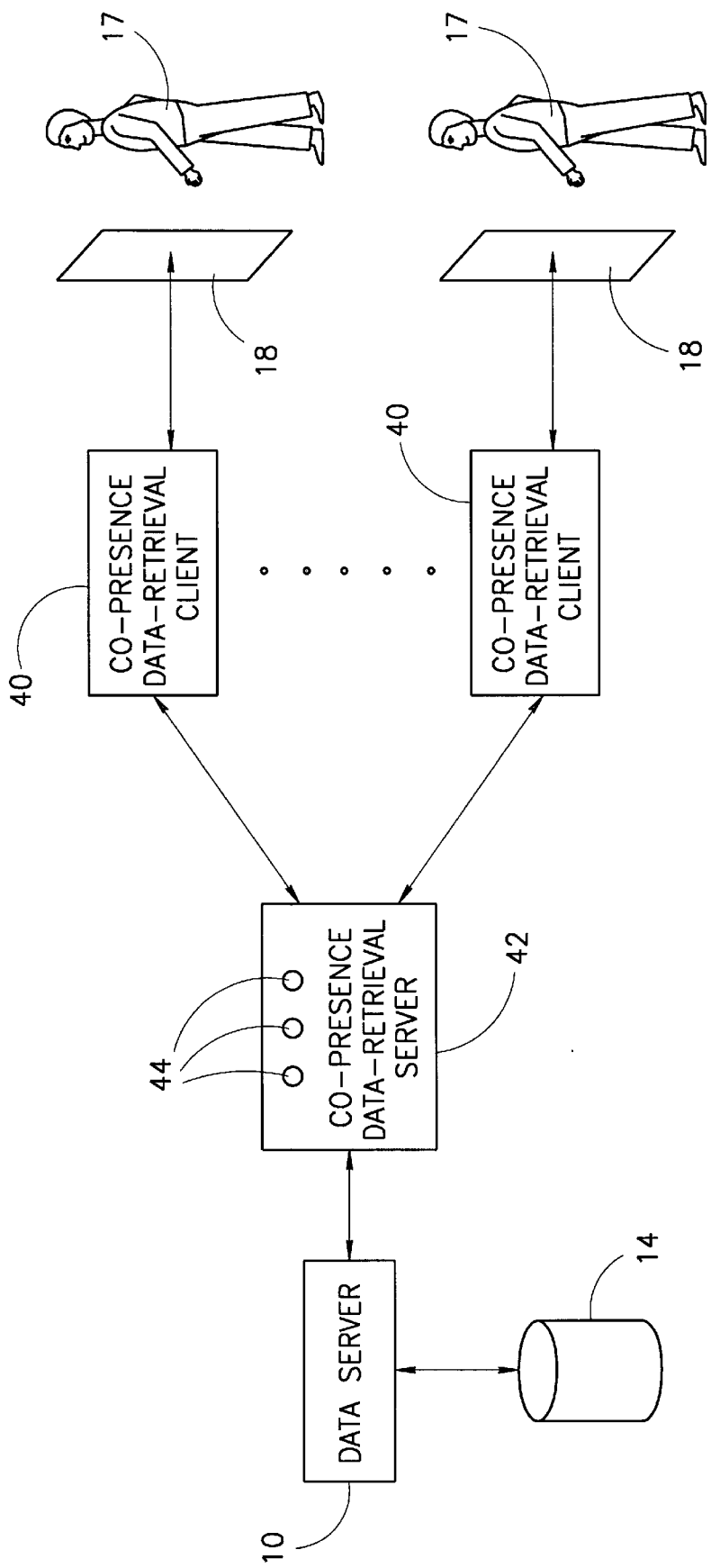
FIG. 5 is a schematic illustration of an alternative embodiment of a co-present data-retrieval system and its operation.

Reference is now made to FIG. 5 which illustrates an alternative embodiment of the present invention. In this embodiment, the data-retrieval system comprises the same elements but they are configured in a different manner. Specifically, the data-retrieval system comprises co-presence data-retrieval clients, labeled 40, and a co-presence data-retrieval server 42, as well as data server 10 and data repository 14 as in the prior art.

In this alternative embodiment, the co-presence data-retrieval clients 40 communicate only with the co-presence data-retrieval server 42, providing to it their data retrieval requests, which the server 42, in turn, passes to the data server 10, and their co-presence communication. The co-presence data-retrieval server 42 includes virtual places 44. There can also be many servers 42, each of which handles data retrieval requests for its associated data server 10.

The following is a pseudo code describing the protocol between clients 40 and server 42:

For client 42 of user U:
  Assume user currently has document D1 in server S1.
  When user requests document D2 from server S2:
    1. Send message "U requests to enter from place P(D1) in server S1" to place P(D2) in co-presence server C(S2)
    2. If data-retrieval is successful, send the message "U Left for place P(D2) in server S2" to place P(D1) in co-presence server C(S1)
  When user U requests to say text T:
    Send the message "U said T" to the co-presence server C(S2)
  Upon receipt of message "V entered (left) for (from) place Dj in server Si":
    Display to the user U the current co-present users in the place P(Dj)
  Upon receipt of message "V said T":
    Display to the user U the message from user V.

For the virtual place P(Di) on co-presence server C(Si)
Let the set of co-present users be CP:
  Upon receipt of message "U left for virtual place P(Dj) in server Sk":
    1. Delete user U from the set CP of co-present users
    2. Send to every remaining user V in CP the message: "U left for virtual place P(Dj) in server Si"
  Upon receipt of the message "U requests to enter from virtual place P(Dj) in server Sk":
    1. Attempt to retrieve data from data server 10
    2. If successful:
      a. Send the data to client 42 of user U
      b. Add user U to the set CP of co-present users
      c. Send to every user V in the set CP of co-present users the message "U entered from virtual place P(Di) in server Si".
  Upon receipt of message "U said T"
    Send the message "U said T" to every user in the set CP of co-present users.

It will be appreciated by persons skilled in the art that the present invention is not limited to what has been particularly shown and described hereinabove. Rather the scope of the present invention is defined by the claims which follow:

We claim:

1. A data retrieval system comprising:
  a data server for retrieving at least a plurality of data objects from a data repository;

means for generating one virtual place per data object retrieved from said data server and for associating each virtual place with its data object once its data object is accessed; and means for providing each virtual place with co-presence for at least two users that access the retrieved data object associated with each virtual place; and means responsive to said co-presence at said virtual place, for placing said at least two users that access said retrieved data object associated with said virtual place in communication with each other.

2. A data retrieval system according to claim 1 and wherein said means for generating comprises:

a co-presence server comprising at least one virtual place; and at least two co-presence data-retrieval clients for communicating at least with said data server and with said co-presence server, each including object association means for associating a data object received from said data server with one of said at least one virtual places in said co-presence server.

3. A data retrieval system according to claim 2 and wherein said co-presence server comprises a changing plurality of place processes, one for each virtual place, and a managing process for providing communication from said co-presence data retrieval clients to said place processes.

4. A data retrieval system according to claim 2 and wherein said object association means comprises means for moving to a new virtual place.

5. A data retrieval system according to claim 1 and wherein said means for generating comprises:

a co-presence server comprising at least one virtual place which communicates with said data server; and at least two co-presence data-retrieval clients for communicating with said co-presence server, each including object association means for associating a data object received from said co-presence server with one of said at least one virtual places in said co-presence server.

6. A data retrieval system according to claim 5 and wherein said co-presence server comprises a changing plurality of place processes, one for each virtual place, and a managing process for providing communication from said co-presence data retrieval clients to said place processes.

7. A data retrieval system according to claim 5 and wherein said object association means comprises means for moving to a new virtual place.

8. A method for upgrading a data-retrieval system comprised of a data repository having data objects stored therein, a data server which retrieves the data objects from the data repository and a plurality of data-retrieval clients, the method comprising the steps of:

adding a co-presence server comprising at least one virtual place associated with one of said data objects; and upgrading at least two of said data-retrieval clients corresponding to at least two open with a system comprising:

means for opening a separate communication channel with said co-presence server;

means for mapping retrieved data objects to said virtual places;

means for displaying co-presence information;

means for enabling co-present users to communicate when said users have co-presence; and means for notifying said co-presence server when said data-retrieval client is terminated.

9. A method for upgrading a data retrieval system comprised of a data server which retrieves the data objects from a data repository and a plurality of data-retrieval clients, the method comprising the steps of:

adding a co-presence server comprising at least one virtual place associated with one of said data objects; and upgrading at least two of said data-retrieval clients corresponding to at least two users with a system comprising:

means for opening a separate communication channel with said co-presence server;

means for mapping retrieved data objects to said virtual places;

means for displaying co-presence information;

means for enabling co-present users to communicate when said users have co-presence; and means for notifying said co-presence server when said data-retrieval client is terminated.

10. A device for providing a communication channel associated with a data object retrieved from a data server, the device comprising:

a co-presence server comprising at least one virtual place associated with said data object;

at least two co-presence data-retrieval clients for communicating at least with said data server and with said co-presence server, each data retrieval client comprising:

object association means for generating a virtual place for said data object said data server and for associating each virtual place with its data object once its data object is accessed; and means associated with said at least one virtual place and responsive to said at least two co-presence data-retrieval clients communicating at least with said data server and with said co-presence server, for enabling communication between said at least two data-retrieval clients that are associated with said at least one virtual place.

11. A device according to claim 10 and wherein said co-presence server comprises a changing plurality of place processes, one for each virtual place, and a managing process for providing communication from said co-presence data retrieval clients to said place processes.

12. A device according to claim 10 and wherein said object association means comprises means for moving to a new virtual place.

13. The system of claim 1, wherein said means for placing said at least two users in communication with each other additionally includes, means for detecting when at least one user terminates said co-presence; and means for terminating communication with said non co-present user.

14. A data retrieval system comprising:

a data server for retrieving at least a plurality of data objects from a data repository;

means for generating one communication object place per data object retrieved from said data server and for associating each communication object with its data object once its data object is accessed;

means for providing each virtual place with co-presence for at least two users that access the retrieved data object associated with each virtual place; and means responsive to said co-presence at said virtual place, for placing said at least two users that access said retrieved data object associated with said communication object in communication with each other.

15. A data retrieval system according to claim 14 and wherein said means for generating comprises:

a co-presence server comprising at least one communication object; and at least two co-presence data retrieval clients for communicating at least with said data server and with said co-presence server, each including object association means for associating a data object received from said data server with one of said at least one communication objects in said co-presence server.

16. A data retrieval system according to claim 15 and wherein said co-presence server comprises a changing plurality of object processes, one for each communication object, and a managing process for providing communication from said co-presence data retrieval clients to said object processes.

17. A data retrieval system according to claim 15 and wherein said object association means comprises means for moving to a new communication object.

18. A data retrieval system according to claim 14 and wherein said means for generating comprises:

a co-presence server comprising at least one virtual place which communicates with said data server; and at least two co-presence data retrieval clients for communicating with said co-presence server, each including object association means for associating a data object received from said co-presence server with one of said at least one virtual places in said co-presence server.

19. A data retrieval system according to claim 18 end wherein said co-presence server comprises a changing plurality of object processes, one for each communication object, and a managing process for providing communication from said co-presence data retrieval clients to said place processes.

20. A data retrieval system according to claim 18 and wherein said object association means comprises means for moving to a new virtual place.

21. A method for accessing data comprising the steps of:

retrieving at least a plurality of data objects from a data repository;

generating one communication object per data object retrieved from said data server;

associating each communication object with its data object once its data object is accessed;

providing each communication object with co-presence for at least two users that access the retrieved data object associated with each communication object; and placing said at least two users that access said retrieved data object associated with said communication object in communication with each other.

22. A method according to claim 21 and wherein said communication object is a virtual place.

* * * * *